Sept. 5, 1933. J. L. MILLER 1,925,929
LIGHTNING AND SURGE ABSORBER
Filed Jan. 9, 1931
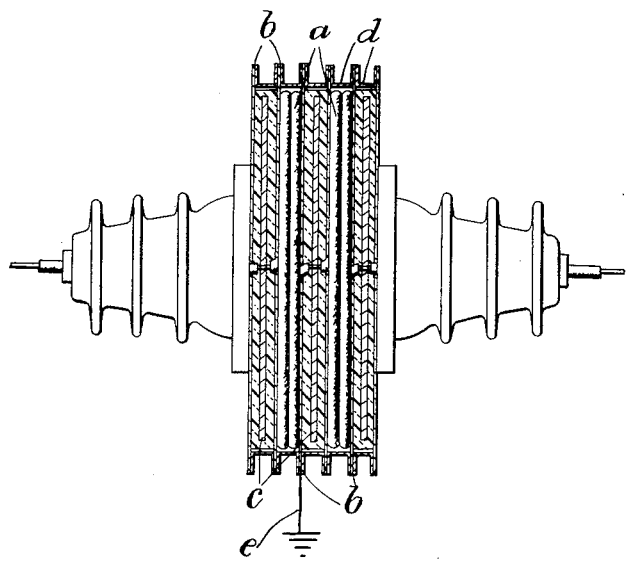
J. L. Miller
INVENTOR
BY: Marks & Clerk

UNITED STATES PATENT OFFICE 1,925,929

LIGHTNING AND SURGE ABSORBER

John Leonard Miller, Hollinwood, England, assignor to Ferranti Inc., New York, N. Y.

Application January 9, 1931, Serial No. 507,749, and in Great Britain February 15, 1930

2 Claims. (Cl. 175—30)

This invention relates to lightning and surge absorbers.

The invention is concerned with lightning and surge absorbers of the type embodying a primary winding formed as one or more discs of flat spiral wound sections each contained between two flat sheets of metal forming the secondary winding.

The effectiveness of surge absorbers of this type depends, inter alia, upon the distributed capacity between the turns of the primary winding and the distributed capacity between the winding and the casing or the flat metal sheets. I have found by experiment that in certain circumstances it is better to have one or more concentrated capacities of a suitable value in the absorber as well as the inherent distributed capacity.

The object of the invention is to provide improved arrangements of lightning and surge absorbers embodying such concentrated capacities.

The invention consists in a lightning or surge absorber of the type indicated incorporating an auxiliary condenser electrode connected electrically to the primary winding and providing a lumped capacity to earth in association with said secondary winding.

The invention further consists in a lightning or surge absorber of the type indicated wherein said capacity or capacities are constituted by metal plates or sheets which together with the associated dielectric and earthed plates or sheets are incorporated in the surge absorber.

The invention further consists in surge absorbers substantially as hereinafter described with reference to the accompanying drawing.

The accompanying diagrammatic drawing illustrates one convenient construction in accordance with the present invention.

According to one convenient example as applied to a multi-section surge absorber wherein each section normally consists of a flat spiral $a$ of insulated wire contained between two metal plates $b$, held apart by rings $d$ the several sections being joined together mechanically and electrically to form the complete absorber connected to earth at $e$, three of the flat spirals of wire are replaced by metal discs $c$ insulated from the plates $b$ forming the so-called secondary. These discs $c$ are connected electrically to the rest of the absorber circuit and so constitute lumped capacities in conjunction with the plates $b$ forming the secondary.

Having now described my invention, what I claim as new and desire to secure by Letters Patent is:—

1. A lightning or surge absorber including a primary winding formed of at least one disc of flat spiral wound section contained between flat sheets of metal constituting a so-called "secondary winding", an auxiliary condenser electrode connected electrically to the primary winding and providing in association with said flat sheets a lumped capacity to earth.

2. A lightning or surge absorber as claimed in claim 1 wherein said auxiliary electrode comprises at least one metal plate separated from the said flat sheets by suitable dielectric material.

JOHN LEONARD MILLER.